(12) United States Patent
Crites et al.

(10) Patent No.: US 9,546,554 B2
(45) Date of Patent: Jan. 17, 2017

(54) GAS TURBINE ENGINE COMPONENTS WITH BLADE TIP COOLING

(71) Applicant: HONEYWELL INTERNATIONAL INC., Morristown, NJ (US)

(72) Inventors: Daniel Cregg Crites, Mesa, AZ (US); Steve Halfmann, Chandler, AZ (US); Mark C. Morris, Phoenix, AZ (US); Ardeshir Riahi, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 741 days.

(21) Appl. No.: 13/629,284

(22) Filed: Sep. 27, 2012

(65) Prior Publication Data

US 2014/0083116 A1    Mar. 27, 2014

(51) Int. Cl.
  *F01D 5/18* (2006.01)

(52) U.S. Cl.
  CPC .............. *F01D 5/187* (2013.01); *Y02T 50/676* (2013.01)

(58) Field of Classification Search
  CPC .. F01D 5/187; Y02T 50/676; F05D 2260/201; F05D 2260/202; F05D 2260/221
  USPC ................. 415/115; 416/96 R, 97 R
  See application file for complete search history.

(56) References Cited

U.S. PATENT DOCUMENTS

| | | | |
|---|---|---|---|
| 3,574,482 A * | 4/1971 | Savage | F01D 5/18 416/232 |
| 3,628,885 A | 12/1971 | Sidenstick et al. | |
| 4,073,599 A | 2/1978 | Allen et al. | |
| 4,424,001 A | 1/1984 | North et al. | |
| 4,474,532 A * | 10/1984 | Pazder | 416/97 R |
| 4,589,824 A * | 5/1986 | Kozlin | F01D 5/187 29/889.721 |
| 5,395,212 A | 3/1995 | Anzai et al. | |
| 5,472,316 A | 12/1995 | Taslim et al. | |
| 5,538,394 A | 7/1996 | Inomata et al. | |
| 5,660,523 A | 8/1997 | Lee | |
| 5,704,763 A * | 1/1998 | Lee | 416/96 R |
| 5,738,493 A | 4/1998 | Lee et al. | |
| 5,902,093 A * | 5/1999 | Liotta | F01D 5/20 415/115 |

(Continued)

FOREIGN PATENT DOCUMENTS

| | | |
|---|---|---|
| EP | 1788195 A2 | 5/2007 |
| GB | 2067671 A | 7/1981 |

OTHER PUBLICATIONS

EPO search report for application No. 13 184 439.1 dated Dec. 11, 2013.

(Continued)

*Primary Examiner* — Ninh H Nguyen
*Assistant Examiner* — Wayne A Lambert
(74) *Attorney, Agent, or Firm* — Lorenz & Kopf, LLP

(57) ABSTRACT

A turbine rotor blade for a turbine section of an engine is provided. The rotor blade includes a platform and an airfoil extending from the platform into a mainstream gas path of the turbine section. The airfoil includes a pressure side wall, a suction side wall joined to the pressure side wall at a leading edge and a trailing edge, and a tip cap extending between the suction side wall and the pressure side wall. The rotor blade further includes an internal cooling circuit having a tip cap passage configured to deliver cooling air to the tip cap and a flow accelerator positioned within the tip cap passage of the internal cooling circuit.

17 Claims, 10 Drawing Sheets

(56) References Cited

U.S. PATENT DOCUMENTS

| | | | |
|---|---|---|---|
| 6,059,530 A | 5/2000 | Lee | |
| 6,135,715 A | 10/2000 | Correia | |
| 6,164,914 A | 12/2000 | Correia et al. | |
| 6,224,336 B1 | 5/2001 | Kercher | |
| 6,511,293 B2 * | 1/2003 | Widrig | F01D 5/187 |
| | | | 415/115 |
| 6,595,748 B2 * | 7/2003 | Flodman | F01D 5/186 |
| | | | 415/115 |
| 6,631,561 B1 | 10/2003 | Anding et al. | |
| 6,709,230 B2 * | 3/2004 | Morrison | F01D 5/189 |
| | | | 415/115 |
| 7,104,757 B2 * | 9/2006 | Gross | 416/97 R |
| 7,249,934 B2 | 7/2007 | Palmer et al. | |
| 7,300,251 B2 * | 11/2007 | Kitamura | F01D 5/186 |
| | | | 416/232 |
| 7,527,470 B2 * | 5/2009 | Guimbard | F01D 5/189 |
| | | | 415/115 |
| 7,549,843 B2 | 6/2009 | Liang | |
| 7,600,973 B2 * | 10/2009 | Tibbott et al. | 416/97 R |
| 7,641,445 B1 | 1/2010 | Liang | |
| 7,704,045 B1 | 4/2010 | Liang | |
| 7,901,183 B1 | 3/2011 | Liang | |
| 8,016,562 B2 | 9/2011 | Gu | |
| 8,113,779 B1 | 2/2012 | Liang | |
| 8,186,965 B2 | 5/2012 | Kuhne et al. | |
| 8,192,146 B2 | 6/2012 | Liang | |
| 2005/0163609 A1 * | 7/2005 | Riahi | F01D 5/186 |
| | | | 415/115 |
| 2005/0238488 A1 * | 10/2005 | Eastman et al. | 416/97 R |
| 2009/0116953 A1 | 5/2009 | Spangler et al. | |
| 2009/0148305 A1 * | 6/2009 | Riahi | F01D 5/147 |
| | | | 416/97 R |
| 2010/0221123 A1 * | 9/2010 | Pal | F01D 5/189 |
| | | | 416/97 R |
| 2012/0201653 A1 * | 8/2012 | Moga et al. | 415/115 |

OTHER PUBLICATIONS

EPO examination report for application No. 13 184 439.1 dated Dec. 20, 2013.
Waseem Siddique Design of Internal Cooling Passages: Investigation of Thermal Performance of Serpentine Passages, 2011.
EP Examination Report for Application No. 113184439.1 dated Oct. 15, 2015.

* cited by examiner

GAS TURBINE ENGINE COMPONENTS WITH BLADE TIP COOLING

TECHNICAL FIELD

The present invention generally relates to gas turbine engines, and more particularly relates to turbine components of gas turbine engines with improved cooling characteristics.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the rotor blades and stator vanes to prevent or reduce adverse impact and extend useful life. Mechanisms for cooling turbine rotor blades include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge, particularly in areas such as the turbine blade tips.

Accordingly, it is desirable to provide gas turbine engines with improved blade tip cooling. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a turbine rotor blade for a turbine section of an engine is provided. The rotor blade includes a platform and an airfoil extending from the platform into a mainstream gas path of the turbine section. The airfoil includes a pressure side wall, a suction side wall joined to the pressure side wall at a leading edge and a trailing edge, and a tip cap extending between the suction side wall and the pressure side wall. The rotor blade further includes an internal cooling circuit having a tip cap passage configured to deliver cooling air to the tip cap and a flow accelerator positioned within the tip cap passage of the internal cooling circuit.

In accordance with an exemplary embodiment, a gas turbine engine includes a compressor section configured to receive compressed air; a combustion section coupled to the compressor section and configured to receive the compressed air, mix the compressed air with fuel, and ignite the compressed air and fuel mixture to produce combustion gases; and a turbine section coupled to the combustion section and configured to receive the combustion gases. The turbine section defines a combustion gas path and includes a turbine rotor positioned within the combustion gas path. The turbine rotor includes airfoil side walls; a tip cap extending between the airfoil side walls; an internal cooling circuit at least partially defined by the airfoil side walls and including a tip cap passage configured to direct cooling air to the tip cap; and a flow accelerator positioned within the tip cap passage.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved cooling characteristics. In particular, exemplary embodiments have turbine blade airfoils with tip cap cooling circuits. The tip cap cooling circuits include one or more flow accelerators to accelerate cooling flow at the tip cap. As a result, cooling may be improved due to increased convection from the high velocity flow and/or increased conduction from enhanced heat flow paths. The increased velocity may also enable more effective use of film cooling holes.

Figure 1:
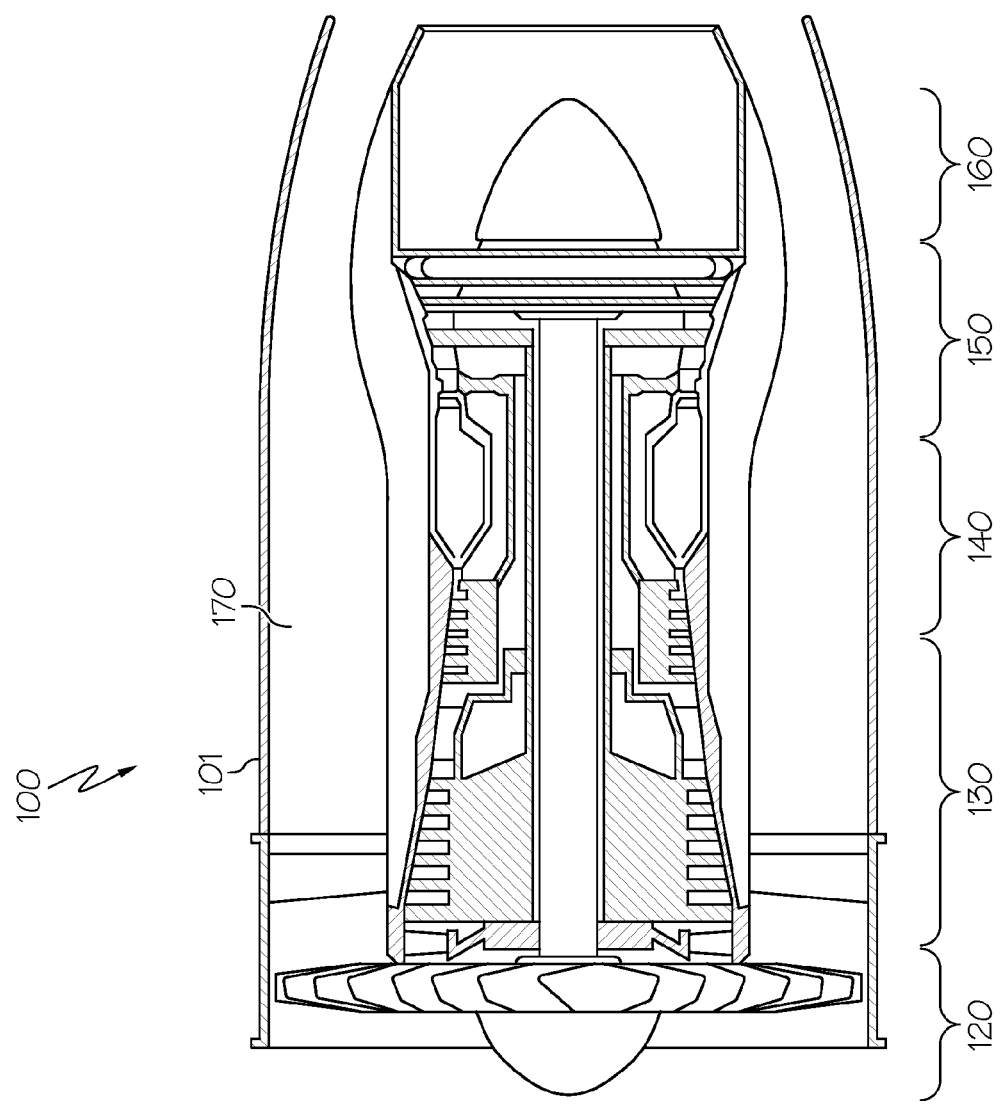
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
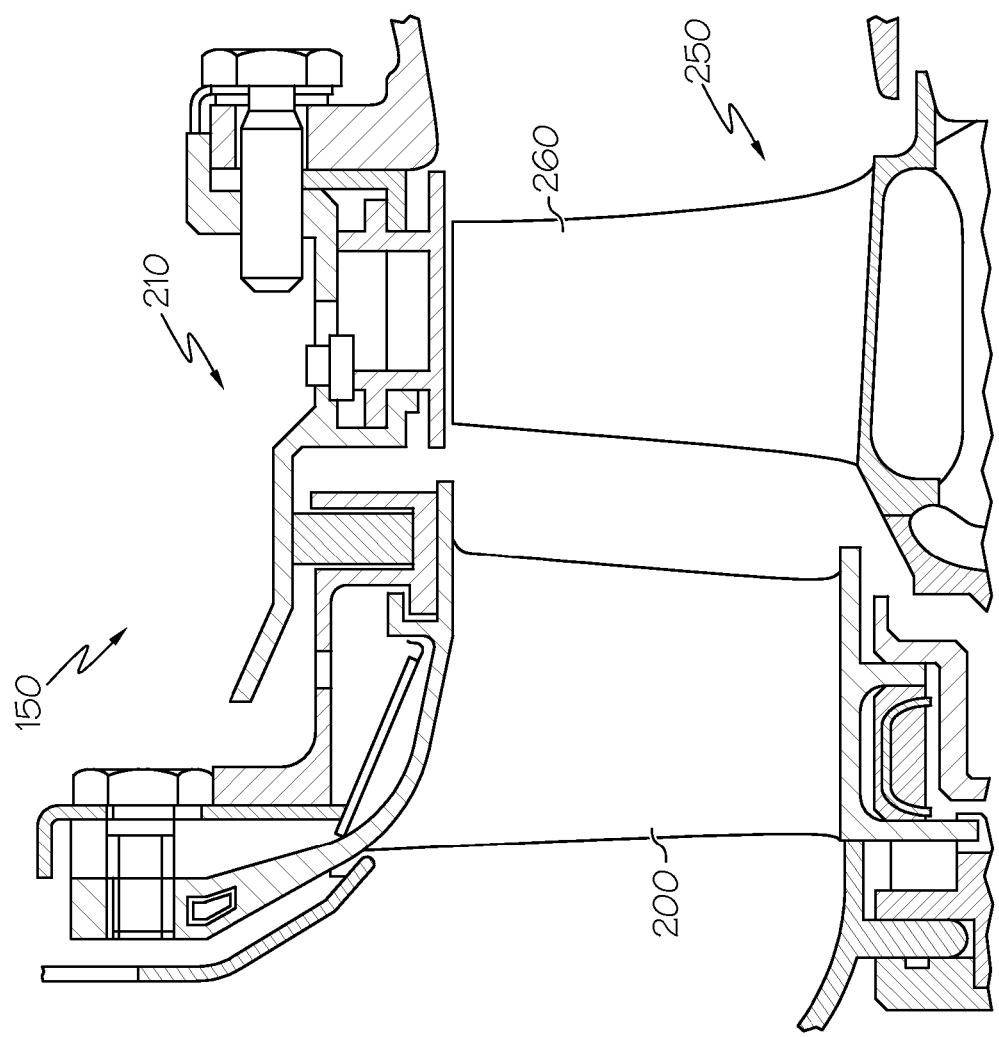
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g. combustion section 140 of FIG. 1) is directed. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled. For example, the rotor blades 260 may be cooled, as described in greater detail below.

Figure 3:
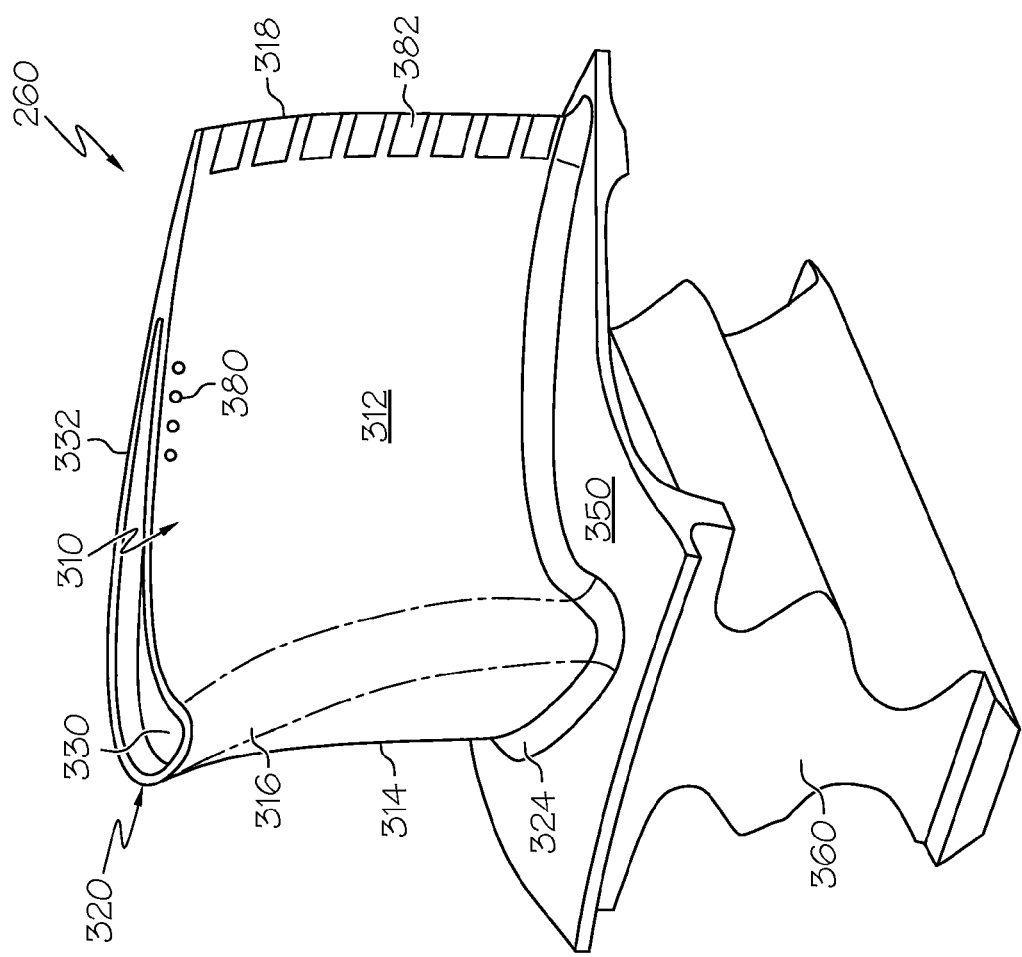
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform and is configured to couple the blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 has two side (or outer) walls 312, 314 each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. The trailing edge 318 includes trailing edge slots 382, discussed below.

In a radial direction, the airfoil side walls 312, 314 extend from a base 324 at the platform 350 to a blade tip 320. In general, the blade tip 320 is positioned to rotate in close proximity to the shroud 210 (FIG. 1) in order to maximize energy extraction. The blade tip 320 is formed by a tip cap 330 and squealer tip extensions 332. The tip cap 330 extends between the side walls 312, 314, typically from leading edge 316 to trailing edge 318. In some exemplary embodiments, the tip cap 330 is recessed relative to the squealer tip extensions 332, which are formed by side walls 312, 314 extending radially beyond the tip cap 330. The tip cap 330 and squealer tip extensions 332 may be designed to minimize the leakage of hot gasses over the blade tip 320 of the rotor blade 260.

As noted above, the rotor blade 260, particularly the airfoil 310, is subject to extremely high temperatures resulting from high velocity hot gases ducted from the combustion section 140 (FIG. 2). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from inlets in the root 360 through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310. In FIG. 3, the film cooling holes 380 are positioned on the blade tip 320, although film cooling holes 380 may be provided in other locations, such as in the area of the leading edge 316 and areas immediately aft of the leading edge 316.

Figure 4:
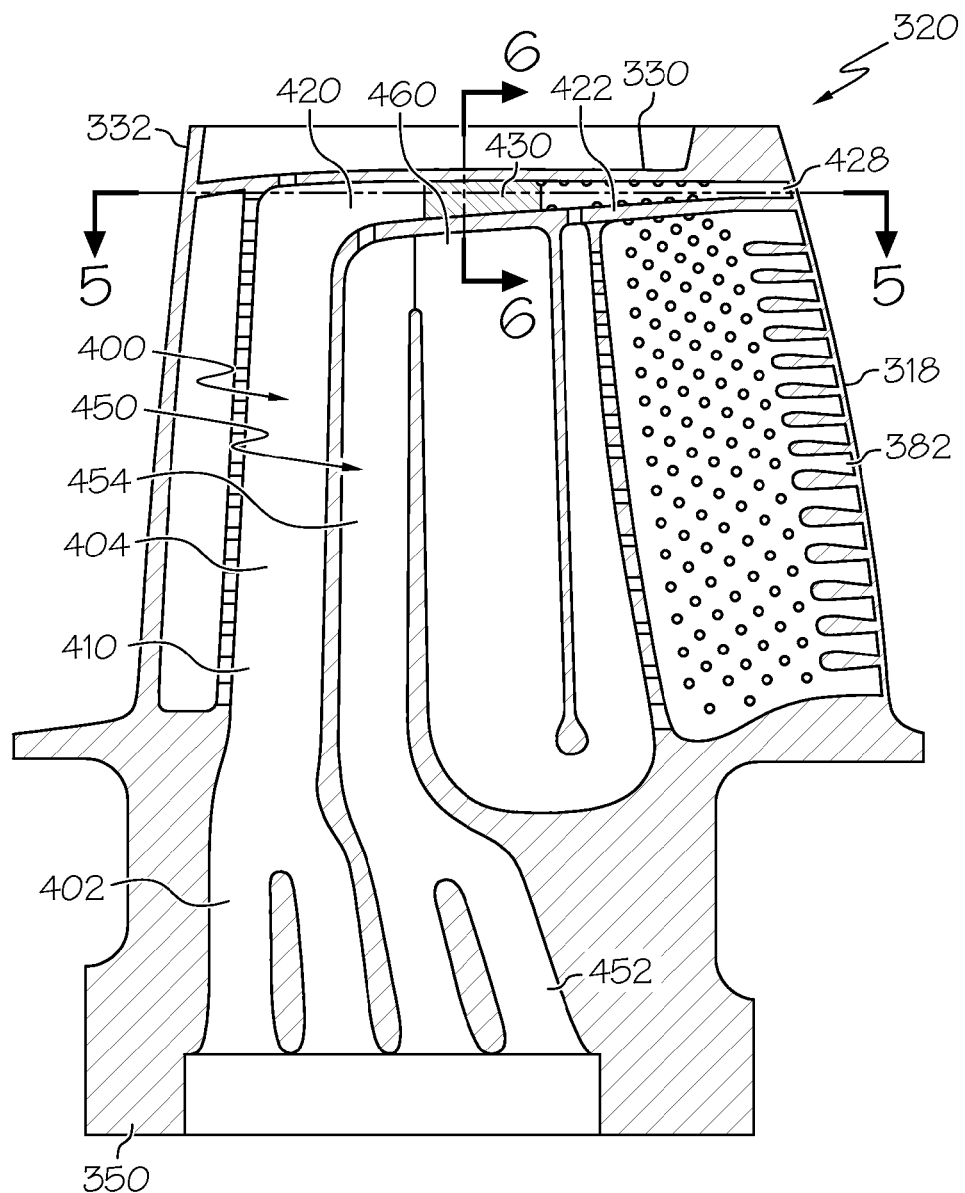
FIG. 4 is a partial cross-sectional view of the turbine rotor blade of FIG. 3 in accordance with an exemplary embodiment.

FIG. 4 is a partial cross-sectional view of the rotor blade 260 of FIG. 3 in accordance with an exemplary embodiment. As shown, the cross-sectional view may generally correspond to a cross-sectional view through a radial-chordwise plane. As discussed above with reference to FIG. 3, the rotor blade 260 includes the platform 350 and the airfoil 310 with leading edge 316 and trailing edge 318. The blade tip 320 includes the tip cap 330 and squealer tip extensions 332.

FIG. 4 particularly shows the interior structure of the rotor blade 260, which includes a first cooling circuit 400 and a second cooling circuit 450. Each of the cooling circuits 400, 450 include a portion 402, 452 extending through the platform 350 and a portion 404, 454 extending through the airfoil 310. The platform portions 402, 452 receive cooling air from passages in the root 360 (FIG. 3) and/or rotor discs (not shown). Such cooling air may be obtained as bleed flow from the compressor section 130 (FIG. 1). The platform portions 402, 452 respectively deliver the cooling air to the airfoil portions 404, 454 to cool the airfoil 310. As described below, the airfoil portions 404, 454 are formed by the side walls 312, 314 and internal structures that direct the air flow through the airfoil 310.

The airfoil portion 404 of the first cooling circuit 400 includes a first passage 410 extending from the platform portion 402 in a generally radial direction, as shown in FIG. 4. In the depicted exemplary embodiment, the first passage 410 is adjacent to the leading edge 316, although other embodiments may have alternate configurations. The airfoil portion 404 of the first cooling circuit 400 further includes a second passage 420 fluidly coupled to the first passage 410 and extending in a generally chordwise direction. The second passage 420 generally extends directly adjacent to the tip cap 330. In other words, the second passage 420 may be completely or partially formed by the tip cap 330 on one side and an interior wall, such as interior wall 422, on the other side. As such, cooling air flows through the first passage 410 to the second passage 420 where the cooling air flows along the underside of the tip cap 330 to cool the blade tip 320. As described in greater detail below, a portion of the cooling air in the second passage 420 may flow through film cooling holes in the side walls (e.g., film cooling holes 380 in side walls 312 or 314 as shown in FIG. 3). Any remaining portion of cooling air may flow through the length of the second passage 420 and out of the first cooling circuit 400 at outlet 428 at the trailing edge 318, e.g., in a chordwise direction from leading edge 316 to trailing edge 318, although other embodiments may include a second passage that directs cooling air in a different direction along the tip cap. In other configurations, the remaining portion of cooling air may flow from the second passage 420 into another internal structure of the airfoil portion and/or out of an alternative outlet.

The first cooling circuit 400 may further include one or more flow accelerators 430 positioned within the second passage 420 to accelerate air flow there through. Exemplary flow accelerators 430 are discussed in greater detail below. Since the first cooling circuit 400 is configured to deliver cooling air to the blade tip 320, the first cooling circuit 400 may be referred to as a blade tip cooing circuit 400.

Now referring to the second cooling circuit 450, the airfoil portion 454 includes a passage 460 extending from the platform portion 452, initially in a generally radial direction and transitioning into a serpentine configuration through the airfoil 310, as shown in FIG. 4, although other embodiments may have alternate configurations. The passage 460 is fluidly coupled to the cooling slots 382 at the trailing edge of the 322 of the airfoil 310. As such, cooling air flows through the passage 460 and exits the airfoil 310 at the cooling slots 382 to thereby cool the side walls 312, 314 (FIG. 3) of the airfoil 310 and/or the trailing edge 318. A portion of the cooling air flowing through the second cooling circuit 450 may be provided to film cooling holes (not shown) formed in the side walls 312, 314 (FIG. 3). The second cooling circuit 450 may be referred to below as a main cooling circuit 450.

Although the first cooling circuit 400 and the second cooling circuit 450 are described as separate circuits, the first cooling circuit 400 and second cooling circuits 450 may be integrated with one another or otherwise be in flow communication. For example, the cooling circuit 450 may additionally or alternatively deliver cooling air to cool the tip cap 330. In one exemplary embodiment, the rotor blade may be a high efficiency, multi-walled turbine blade that is fed from the center body.

Figure 5:
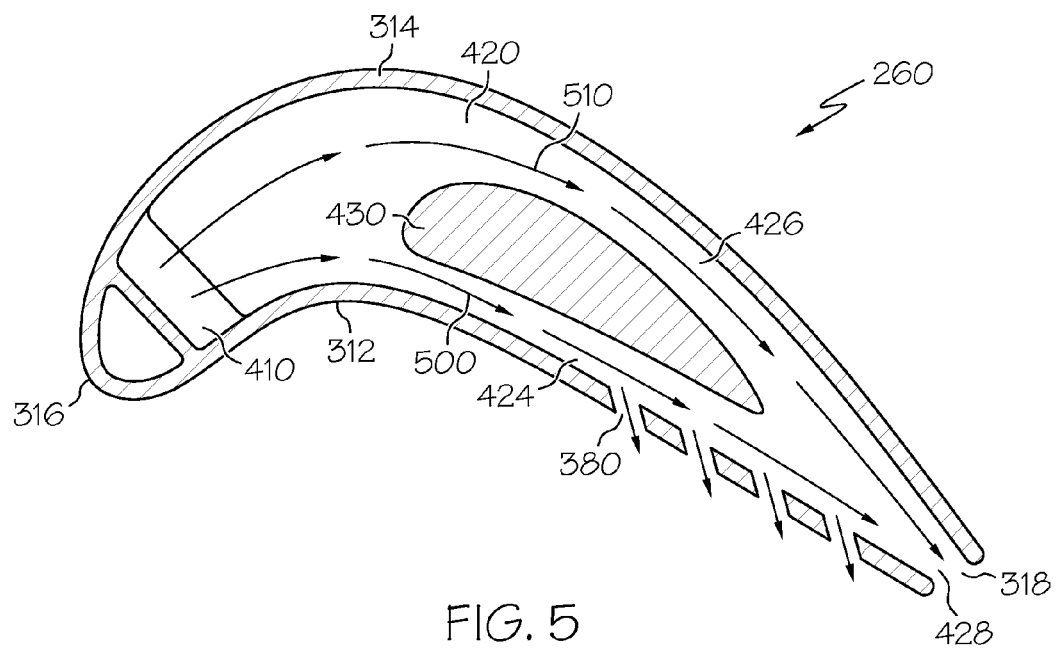
FIG. 5 is a partial cross-sectional view of the turbine rotor blade along line 5-5 of FIG. 4 in accordance with an exemplary embodiment.

FIG. 5 is a cross-sectional view of the rotor blade 260 through line 5-5 of FIG. 4. The view of FIG. 5 may be considered a cross-sectional view in an axial-chordwise plane through the second passage 420 of the first cooling circuit 400 described with respect to FIG. 4. As such, additionally referring to FIG. 4, the rotor blade 260 depicted in FIG. 5 includes the side walls 312, 314, the leading edge 316, and the trailing edge 318.

As also described above, the second passage 420 receives cooling air (indicated by arrows 500, 510) from the first passage 410 and the cooling air flows in a generally chordwise direction. As particularly shown in FIG. 5, the flow accelerator 430 is positioned in the second passage 420 to accelerate the cooling flow through the second passage 420.

Figure 6:
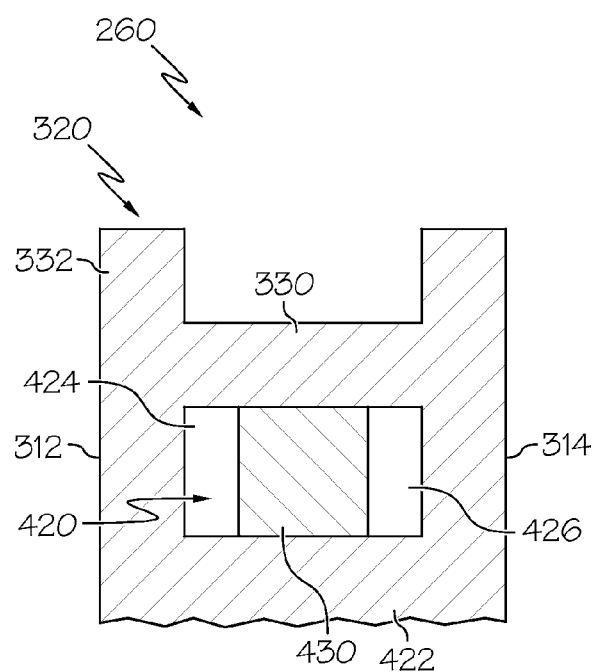
FIG. 6 is a partial cross-sectional view of the turbine rotor blade along line 6-6 of FIG. 4 in accordance with an exemplary embodiment.

FIG. 6 is a cross-sectional view of the rotor blade 260 through line 6-6 of FIG. 4. The view of FIG. 6 may be considered a cross-sectional view in an axial-radial plane through the second passage 420 of the first cooling circuit 400 described with respect to FIG. 4. As such, additionally referring to FIGS. 4 and 5, the portion of rotor blade 260 depicted in FIG. 6 includes the side walls 312, 314, the interior wall 422, and the blade tip 320, including the tip cap 330 and the squealer tip extensions 332. As particularly shown in FIG. 6, the flow accelerator 430 is positioned in the second passage 420 to accelerate the cooling flow through the second passage 420, as will now be discussed in greater detail.

Referring now to FIGS. 4-6, the flow accelerator 430 is positioned in the second passage 420 to enhance cooling at the blade tip 320. The flow accelerator 430 blocks a portion of the second passage 420 and the resulting reduction in flow area functions to increase the speed of the cooling flow. The flow accelerator 430 may have any suitable shape that prevents or mitigates flow or pressure losses through the second passage 420. In other words, the flow accelerator 430 is typically shaped such that the cooling flow smoothly flows around the flow accelerator 430, thereby preventing or mitigating pressure losses that may otherwise counteract the acceleration of the cooling flow resulting from the reduction in flow area. As particularly shown in FIG. 5, the flow accelerator 430 has a tear-drop or airfoil shape to facilitate this function. For example, the flow accelerator 430 may have a generally curved leading edge that smoothly transitions into generally curved side edges and terminates with a trailing edge. The edges are shaped so as to prevent or mitigate vortices or turbulence through the second passage 420. Other shapes that reduce flow area while preventing or mitigating pressure losses may be provided.

The flow accelerator 430 may have a volume or cross-sectional areas that advantageously accelerate the cooling flows. For example, in the exemplary volume depicted by FIGS. 4 and 5, the flow accelerator 430 may occupy approximately 50% or more of the volume of the second passage 420 (e.g., the volume defined by the side walls 312, 314, the leading edge 316, the trailing edge 318, the interior wall 422, and the tip cap 330). As another example, in the exemplary cross-section depicted by FIG. 6, the flow accelerator 430 occupies approximately 50% of more of the respective cross-sectional area of the second passage 420 (e.g., the cross-sectional area defined by the side walls 312, 314, the interior wall 422, and the tip cap 330). Other volume or cross-sectional area ratios of the flow accelerator 430 relative to the second passage 420 may be provided.

As shown in the depicted exemplary embodiment of FIGS. 5 and 6, the flow accelerator 430 extends the entire radial height of the second passage 420, e.g., from the interior wall 422 to the tip cap 330. As such, the second passage 420 is separated into a first passage portion 424 and a second passage portion 426 that extend on either side of the flow accelerator 430.

The configuration of the blade tip 320 facilitates cooling in a number of ways. For example, the cooling air flowing through the second passage 420 removes heat from the blade tip 320. The flow accelerator 430 particularly supports this function. Referring to FIG. 5, the airfoil shape of the turbine blade and the position of the flow accelerator 430 within the second passage 420 results in a larger cross-sectional area in the forward portion of the second passage 420 and a smaller cross-sectional area in the aft portion of the second passage 420. As such, the velocity of the cooling air through the second passage 420 is increased as a result of the flow accelerator 430. Since velocity of the cooling air is proportional to the cross-sectional area and since heat transfer is proportional to passage velocity, reduced cross-sectional area from the flow accelerator 430 results in increased heat removal from the tip cap 330 and side walls 312, 314 via convection.

Additionally, the structure of the flow accelerator 430 improves heat removal by enhancing the conduction paths through the blade tip 320. For example, since the flow accelerator 430 is within the cooling flow path, the flow accelerator 430 will generally be at a lower temperature than other portions of the blade tip 320, particularly the squealer tip extensions 332 and tip cap 330. As a result of the temperature difference, the heat from the squealer tip extensions 332 and tip cap 330 will migrate to the flow accelerator 430, thereby increasing the ability of the cooling air flow to remove the heat. Similar heat transfer paths may exist between the squealer tip extensions 332 and tip cap 330 to the side walls 312, 314 and/or the interior wall 422, thereby decreasing the temperature of the blade tip 320. In the exemplary embodiment depicted in FIG. 6, the flow accelerator 430 extends from the tip cap 330 to the interior wall 422, which may enhance these conduction flow paths.

As an additional cooling mechanism, the flow accelerator 430 increases the flow velocity while mitigating or preventing flow losses, thereby maximizing the pressure within the second passage 420 (e.g., relative to utilizing other heat transfer mechanisms such as turbulators or pin fins). The pressure of the cooling air within the second passage 420 enables a portion of the cooling flow to flow out of the film cooling holes 380, thereby enhancing film cooling on the outer surface of the rotor blade 260. In conventional turbine blades, loss of pressure within the second passage may adversely impact or prevent film cooling.

FIGS. 7-10 depict alternative embodiments of flow accelerators within the second passage of the turbine blade. Generally, unless otherwise noted, the configuration and structure of the turbine blades of FIGS. 7-10 are similar to the turbine blade depicted in FIGS. 2-6. FIGS. 7-10 are discussed in greater detail below.

Figure 7:
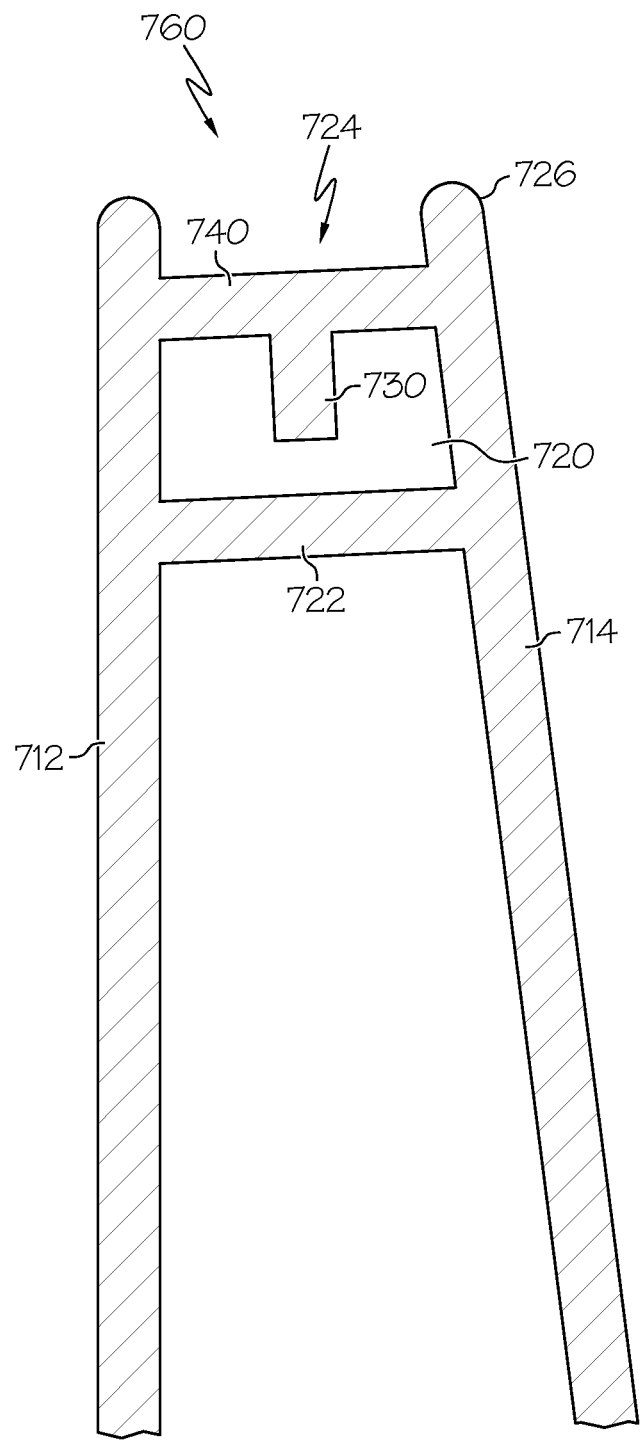
FIG. 7 is a partial cross-sectional view of a turbine airfoil in accordance with an alternate exemplary embodiment.

FIG. 7 a cross-sectional view of a rotor blade 760 similar to the view of FIG. 6. The view of FIG. 7 may be considered a cross-sectional view in an axial-radial plane through a tip cooling passage 720 of a cooling circuit. As such, the portion of rotor blade 760 depicted in FIG. 7 includes the side walls 712, 714, the interior wall 722, and the blade tip 724, including the tip cap 740 and the squealer tip extensions 726. As particularly shown in FIG. 7, the flow accelerator 730 is positioned in the passage 720 to accelerate the cooling flow through the passage 720. As compared to the flow accelerator 430 of FIG. 6, the flow accelerator 730 extends from the tip cap 740 to only a portion of the radial distance (or radial height) between the tip cap 740 and the interior wall 722. For example, the flow accelerator 730 extends approximately three-quarters of the radial distance, although other dimensions may be provided.

Figure 8:
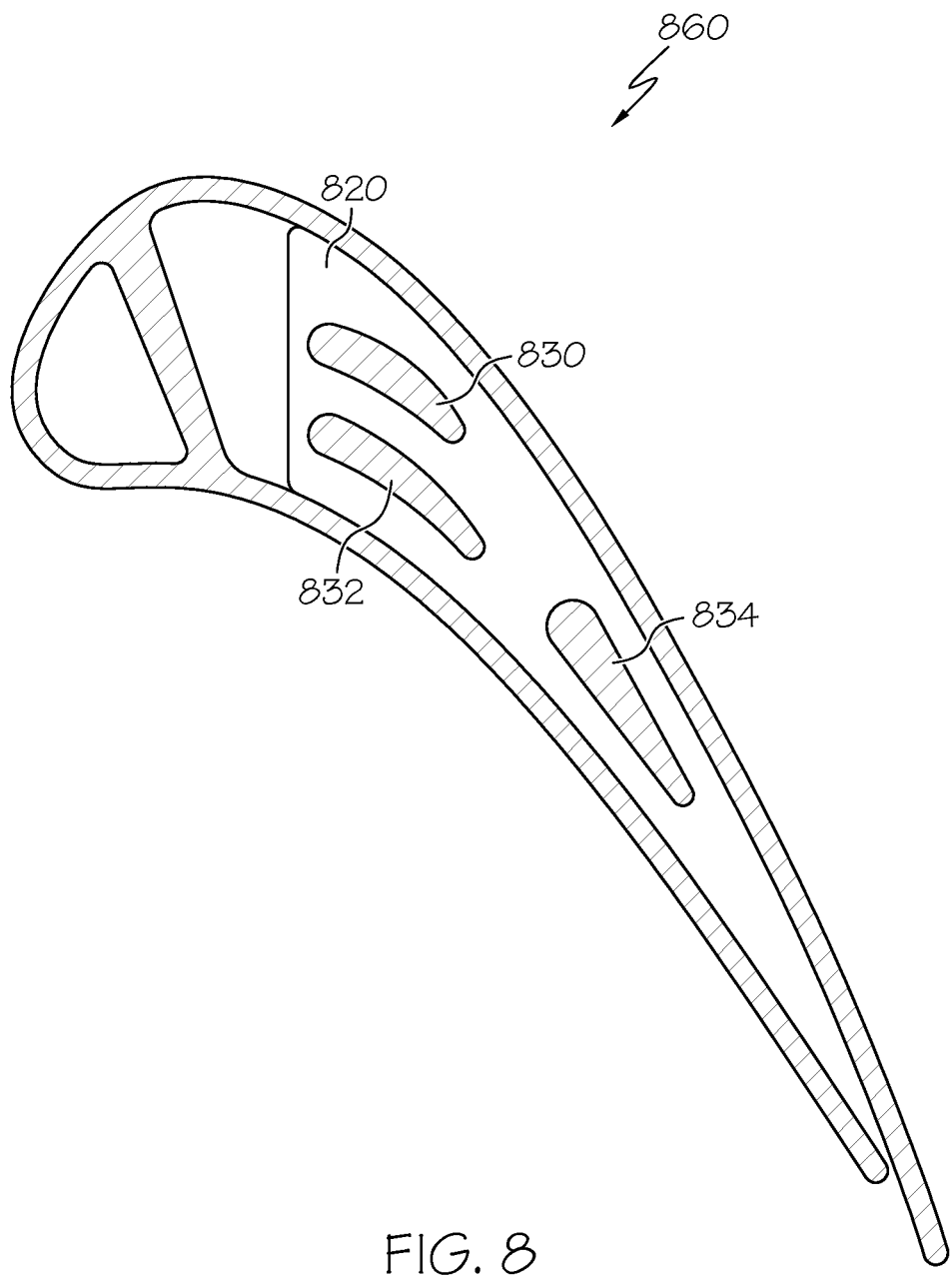
FIG. 8 is a partial cross-sectional view of a turbine airfoil in accordance with an alternate exemplary embodiment.

FIG. 8 is a cross-sectional view of a rotor blade 860 similar to the view of FIG. 5 discussed above. Like FIG. 8, the view of FIG. 5 may be considered a cross-sectional view in an axial-chordwise plane through a tip cooling passage 820 of a cooling circuit. As above, the passage 820 receives cooling air from within the rotor blade 860 and the cooling air flows in a generally chordwise direction.

FIG. 8 additionally includes a number of flow accelerators 830, 832, 834 positioned in the passage 820 to accelerate the cooling flow through the passage 820. The flow accelerators 830, 832, 834 are generally airfoil-shaped and may be arranged in any suitable manner to accelerate cooling flow while preventing or mitigating pressure loss.

Figure 9:
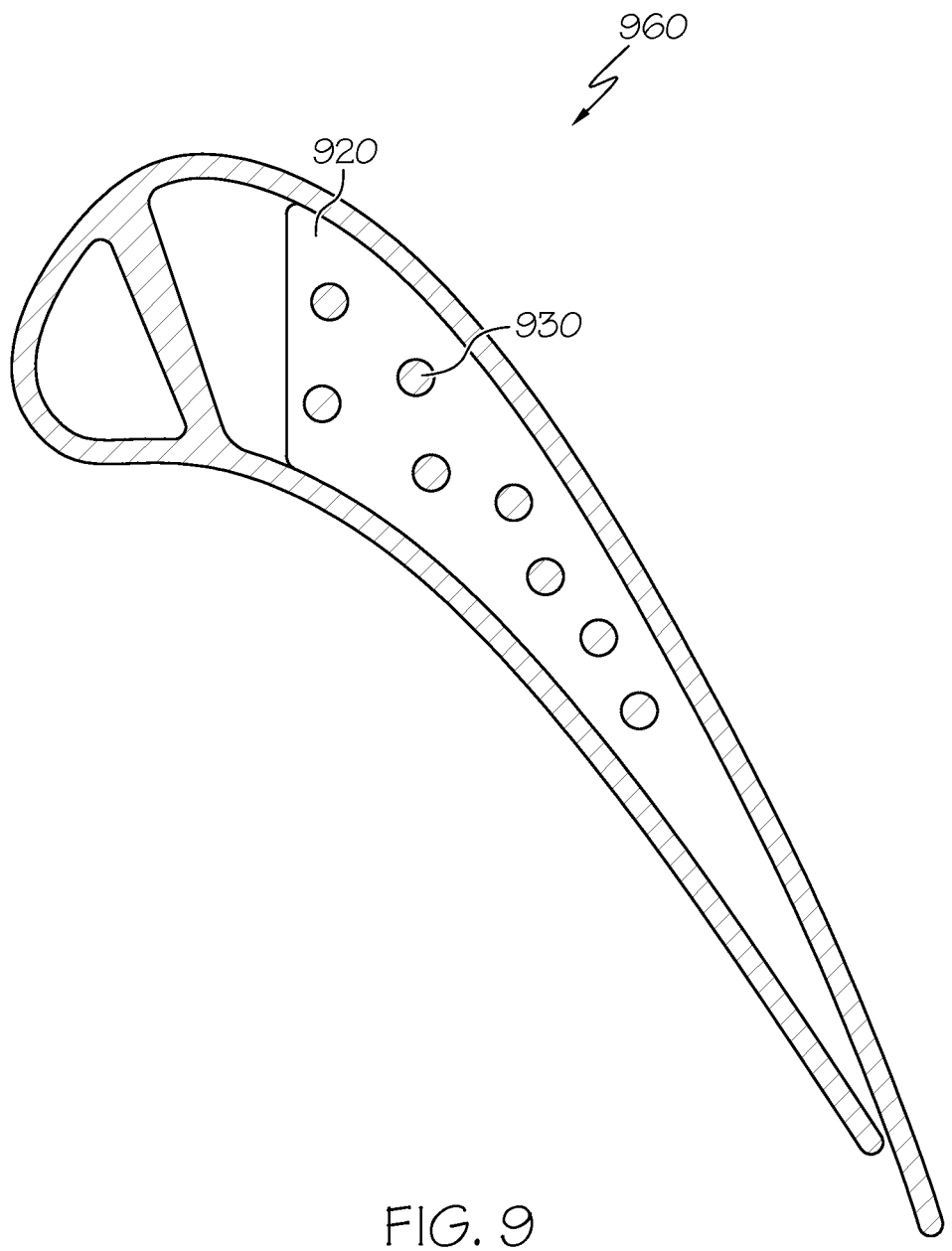
FIG. 9 is a partial cross-sectional view of a turbine airfoil in accordance with an alternate exemplary embodiment.

FIG. 9 is a cross-sectional view of a rotor blade 960 similar to the view of FIG. 5 discussed above. Like FIG. 9, the view of FIG. 5 may be considered a cross-sectional view in an axial-chordwise plane through a tip cooling passage 920 of a cooling circuit. As above, the passage 920 receives cooling air from within the rotor blade 960 and the cooling air flows in a generally chordwise direction.

FIG. 9 additionally includes a number of flow accelerators 930 in the form of multiple pins positioned in the passage 920 to accelerate the cooling flow through the passage 920. The flow accelerators 930 are generally cylindrical, oval, or airfoil shaped and may be arranged in any suitable manner to accelerator cooling flow while preventing or mitigating pressure loss.

Figure 10:
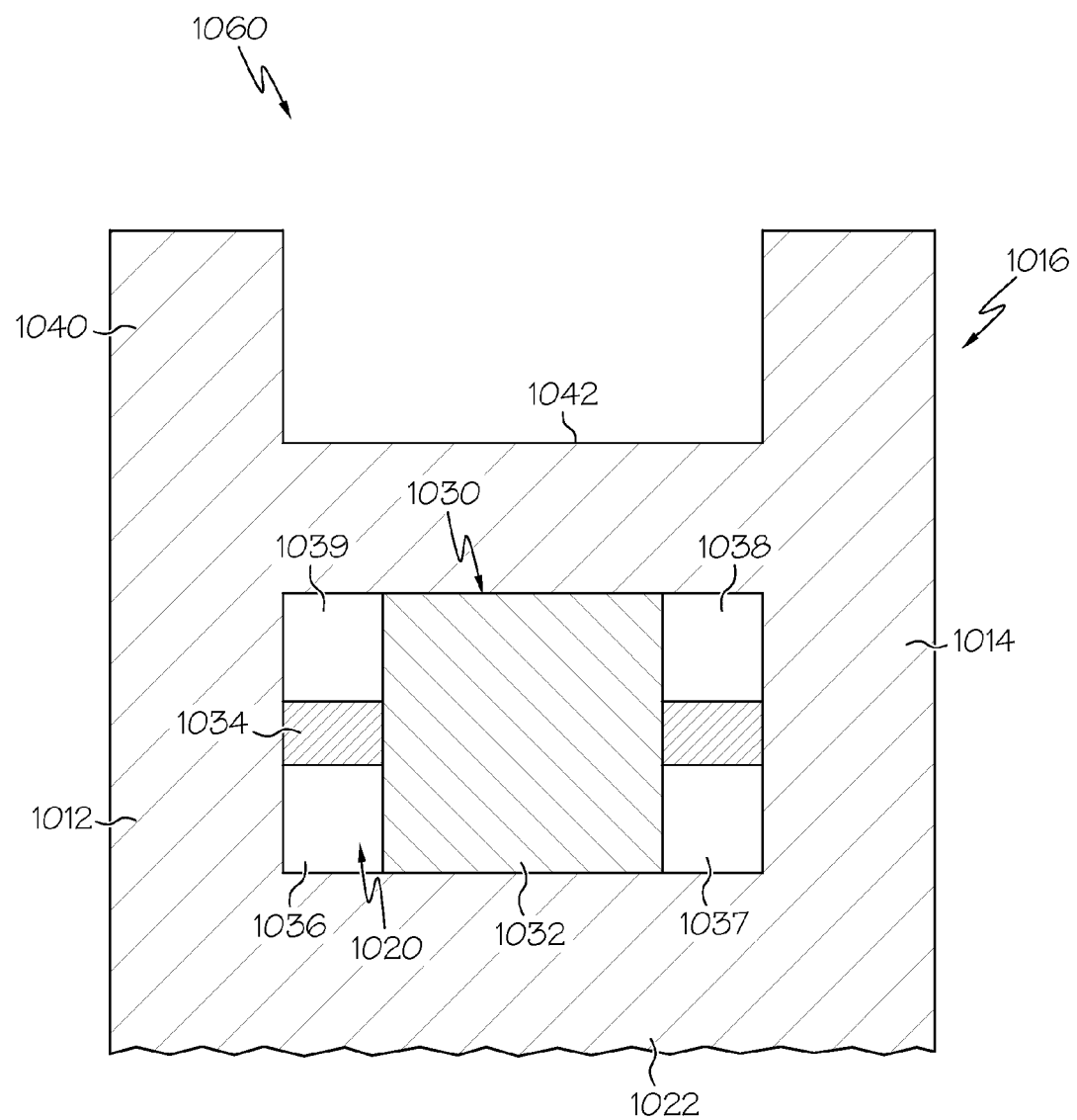
FIG. 10 is a partial cross-sectional view of a turbine airfoil in accordance with an alternate exemplary embodiment.

FIG. 10 a cross-sectional view of a rotor blade 1060 similar to the view of FIG. 6. The view of FIG. 10 may be considered a cross-sectional view in an axial-radial plane through a tip cooling passage 1020 of a cooling circuit. As such, the portion of rotor blade 1060 depicted in FIG. 7 includes the side walls 1012, 1014, the interior wall 1022, and the blade tip 1016, including the tip cap 1042 and the squealer tip extensions 1040. As particularly shown in FIG. 10, the flow accelerator 1030 is positioned in the passage 1020 to accelerate the cooling flow through the passage 1020. In this exemplary embodiment, the flow accelerator 1030 has a radial portion 1032 that extends from the tip cap 1042 to the interior wall 1022. In an axial cross-section, the radial portion 1032 may have a shape such as the flow accelerator 430 described above. The flow accelerator 1030 further includes a lateral portion 1034 that extends between the side walls 1012, 1014 (or from a first side of the radial portion 1032 to side wall 1012 and from a second side of the radial portion 1032 to side wall 1014). The lateral portion 1034 may have a hydrofoil or airfoil shape. As such, in the depicted exemplary embodiment, the passage 1020 may be divided into four segments 1036, 1037, 1038, 1039 to accelerate cooling flow while preventing or mitigating pressure loss.

Figure 11:
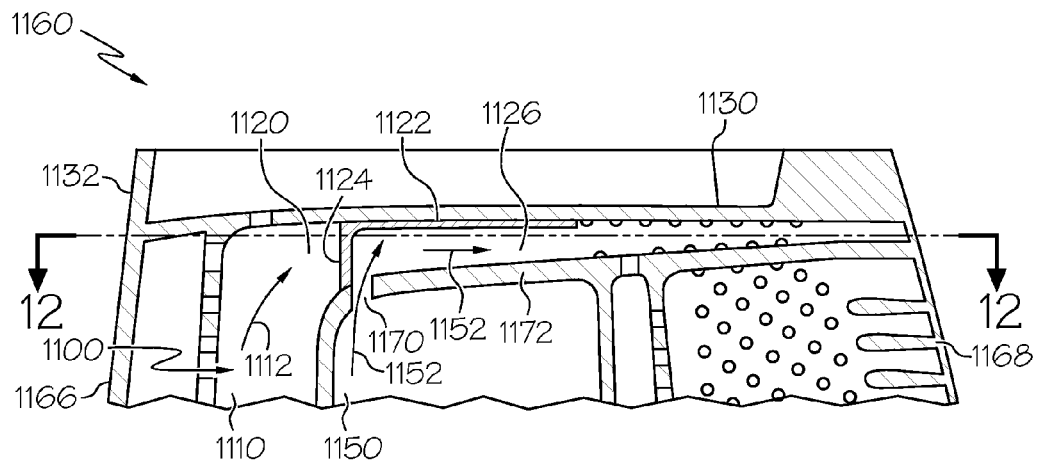
FIG. 11 is a partial cross-sectional view of a turbine rotor blade in accordance with an alternate exemplary embodiment.
Figure 12:
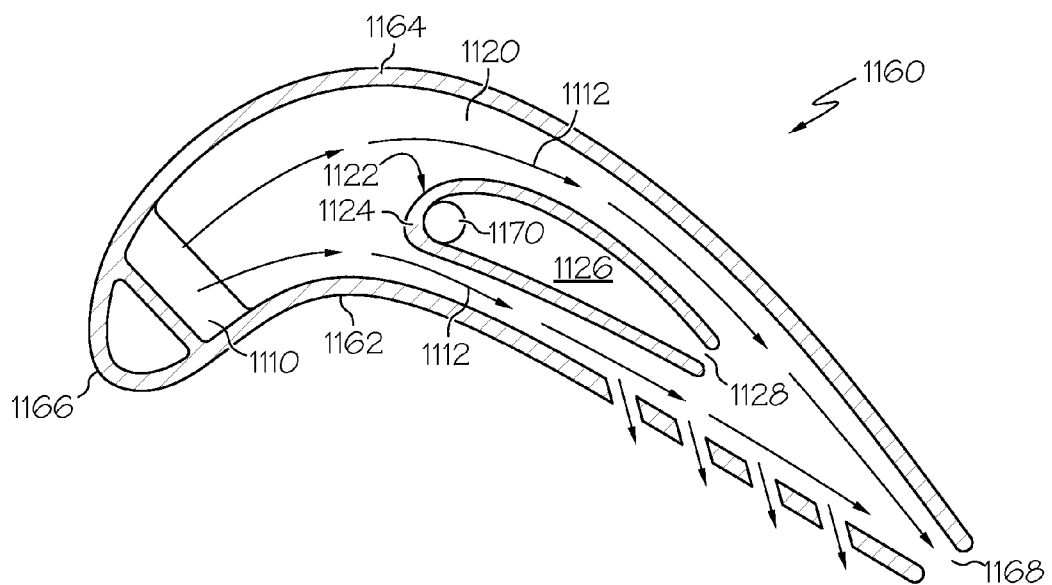
FIG. 12 is a partial cross-sectional view of the turbine rotor blade along line 12-12 of FIG. 11 in accordance with an exemplary embodiment.

FIG. 11 is a partial cross-sectional view of a turbine rotor blade 1160 (e.g., the outer radial portion of the blade 1160) in accordance with an alternate exemplary embodiment, and FIG. 12 is a partial cross-sectional view of the turbine rotor blade 1160 along line 12-12 of FIG. 11 in accordance with an exemplary embodiment. As above, the turbine rotor blade 1160 may include side walls 1162, 1164, a leading edge 1166, and a trailing edge 1168. The turbine rotor blade 1160 further includes a tip cap 1130 and squealer tip extension 1132.

The turbine rotor blade 1160 of FIGS. 11 and 12 includes cooling circuits 1100, 1150 similar to the cooling circuits 400, 450 described with respect to FIG. 4, although the cooling circuits 1100, 1150 may be modified as necessary or desired. In the depicted exemplary embodiment, the cooling circuit 1100 includes a first passage 1110 that delivers cooling air (e.g., cooling air 1112) to a second passage 1120, which extends in a chordwise direct such that the cooling air cools the tip cap 1130, as described above. As also described above, an accelerator 1122 may be positioned within the second passage 1120 to accelerate the cooling air flowing through the second passage 1120, thus resulting in improved convection and conduction cooling while mitigating and/or preventing flow losses.

In this exemplary embodiment, the accelerator 1122 may be hollow or otherwise include an outer wall 1124 and an interior space 1126. As best shown by FIG. 11, the second cooling circuit 1150 may deliver a cooling flow (e.g., cooling flow 1152 through an interior or central passage) through an inlet 1170 in the interior wall 1172 to the interior portion 1126 of the accelerator 1122. The cooling flow 1152 may impinge the underside of the wall 1124 to provide impingement cooling, as well as convection and/or conduction cooling. The cooling flow 1152 then flows in an aft chordwise direction through the accelerator 1122 and out of the accelerator 1122 at an accelerator outlet 1128. The cooling flow 1152 subsequently flows through the second passage 1120 (e.g., with the cooling flow 1112 from the first cooling circuit 1100) and out of the turbine rotor blade 1160 at the trailing edge 1168. In general, the cooling flow 1152 flows through the accelerator 1122 and second passage 1120 in a low-loss manner, and in some exemplary embodiments, the cooling flow 1152 may function to increase pressure within the second passage 1120, thereby potentially enhancing the overall cooling flow.

Accordingly, turbine rotors with improved blade tip cooling are provided. Exemplary embodiments of the turbine blades discussed above have resulted in an ability to increase engine temperature, thereby improving fuel consumption. In addition to the flow accelerators discussed above, exemplary embodiments may also use turbulators, depressions, and other techniques that may enhance tip cap cooling. In general, the flow accelerators may be formed in a selected pattern or array to provide optimum cooling. Computational fluid dynamic (CFD) analysis can additionally be used to optimize the location and orientation of the flow accelerators and cooling circuits and passages. Exemplary embodiments promote the service life and/or enhanced performance in a cost-effective manner. The turbine blades produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine rotor blade for a turbine section of an engine, comprising:
   a platform; and
   an airfoil extending from the platform into a mainstream gas path of the turbine section, the airfoil comprising
      a pressure side wall,
      a suction side wall joined to the pressure side wall at a leading edge and a trailing edge, and
      a tip cap extending between the suction side wall and the pressure side wall,
      an internal cooling circuit having a tip cap passage configured to deliver cooling air to the tip cap, the airfoil including an interior wall that defines the tip cap passage with the tip cap, the pressure side wall, and the suction side wall, wherein the tip cap passage has a chordwise length between an inlet and an outlet at the trailing edge; and
      a flow accelerator positioned within the tip cap passage of the internal cooling circuit, the flow accelerator extending in a radial direction from the tip cap toward the interior wall to define at least a first flow area for the cooling air between the flow accelerator and the pressure side wall and a second flow area for the cooling air between the flow accelerator and the suction side wall,
      wherein the tip cap passage has at least a first cross-sectional area defined between the tip cap, the internal wall, the suction side wall, and the pressure side wall, and wherein the flow accelerator, at a position corresponding to the first cross-sectional area, has a second cross-sectional area that is at least 50% of the first cross-sectional area, and
      wherein the flow accelerator is generally tear-drop or airfoil shaped and generally extends in a chordwise direction to accelerate a flow of the cooling air through the tip cap passage,
      wherein the flow accelerator is hollow with an outer wall and interior space, and wherein the internal cooling circuit includes a central passage that delivers cooling air that impinges on an underside of the outer wall within the interior space.

2. The turbine rotor blade of claim 1, wherein the flow accelerator extends in the radial direction from the tip cap to the interior wall.

3. The turbine rotor blade of claim 2, wherein the pressure side wall defines first squealer tip extensions extending beyond the tip cap and the suction side wall defines second squealer tip extensions extending beyond the tip cap, and wherein the tip cap forms a first heat transfer path between the first squealer tip extensions and the flow accelerator and a second heat transfer path between the second squealer tip extensions and the flow accelerator.

4. The turbine rotor blade of claim 1, wherein the tip cap passage of the internal cooling circuit has a radial height defined between the interior wall and the tip cap, and wherein the flow accelerator extends from the tip cap at a distance less than the radial height.

5. The turbine rotor blade of claim 4, wherein the distance is approximately three-quarters of the radial height.

6. The turbine rotor blade of claim 1, wherein the flow accelerator is a first flow accelerator and the turbine rotor further comprises additional flow accelerators positioned within the tip cap passage of the internal cooling circuit.

7. The turbine rotor blade of claim 6, wherein the additional flow accelerators are airfoil-shaped.

8. The turbine rotor blade of claim 6, wherein the additional flow accelerators are pin-shaped.

9. The turbine rotor blade of claim 6, wherein the additional flow accelerators includes a second flow accelerator with a first portion extending in across the tip cap passage between the first flow accelerator and the suction side wall and a second portion extending in across the tip cap passage between the first flow accelerator and the pressure side wall.

10. The turbine rotor blade of claim 1, wherein the flow accelerator includes a radial portion extending from the tip cap to the interior wall and a lateral portion extending from the pressure side wall to the suction side wall.

11. The turbine rotor blade of claim 1, wherein the pressure side wall includes film cooling holes fluidly coupled to the tip cap passage.

12. The turbine rotor blade of claim 1, wherein the flow accelerator is positioned within an interior of the tip cap passage and separated from the trailing edge and the outlet at a distance.

13. A gas turbine engine, comprising:
a compressor section configured to receive and compress air;
a combustion section coupled to the compressor section and configured to receive the compressed air, mix the compressed air with fuel, and ignite the compressed air and fuel mixture to produce combustion gases; and
a turbine section coupled to the combustion section and configured to receive the combustion gases, the turbine section defining a combustion gas path and comprising a turbine rotor positioned within the combustion gas path, the turbine rotor comprising
a suction side wall;
a pressure side wall joined to the suction side wall at a leading edge and a trailing edge;
a tip cap extending between the pressure side wall and the suction side wall;
an interior wall extending between the pressure side wall and the suction side wall;
an internal cooling circuit including a tip cap passage at least partially defined the pressure side wall, the suction side wall, the tip cap, and the interior wall and configured to direct cooling air to the tip cap, wherein the tip cap passage has a chordwise length between an inlet and an outlet at the trailing edge; and
a flow accelerator positioned within the tip cap passage, the flow accelerator extending in a radial direction from the tip cap toward the interior wall to define at least a first flow area for the cooling air between the flow accelerator and the pressure side wall and a second flow area for the cooling air between the flow accelerator and the suction side wall,
wherein the tip cap passage has at least a first cross-sectional area defined between the tip cap, the internal wall, the suction side wall, and the pressure side wall, and wherein the flow accelerator, at a position corresponding to the first cross-sectional area, has a second cross-sectional area that is at least 50% of the first cross-sectional area, and
wherein the flow accelerator is generally tear-drop or airfoil shaped and generally extends in a chordwise direction to accelerate a flow of the cooling air through the tip cap passage,
wherein the flow accelerator is hollow with an outer wall and interior space, and wherein the internal cooling circuit includes a central passage that delivers cooling air that impinges on an underside of the outer wall within the interior space.

14. The gas turbine engine of claim 13, wherein the flow accelerator extends in the radial direction from the tip cap to the interior wall.

15. The gas turbine engine of claim 13, wherein the tip cap passage of the internal cooling circuit has a radial height defined between the interior wall and the tip cap, and wherein the flow accelerator extends from the tip cap at a distance less than the radial height.

16. The gas turbine engine of claim 13, wherein the flow accelerator is hollow with an outer wall and interior space.

17. A gas turbine engine, comprising:
a compressor section configured to receive and compress air;
a combustion section coupled to the compressor section and configured to receive the compressed air, mix the compressed air with fuel, and ignite the compressed air and fuel mixture to produce combustion gases; and
a turbine section coupled to the combustion section and configured to receive the combustion gases, the turbine section defining a combustion gas path and comprising a turbine rotor positioned within the combustion gas path, the turbine rotor comprising
airfoil side walls;
a tip cap extending between the airfoil side walls;
an internal cooling circuit at least partially defined by the airfoil side walls and including a tip cap passage configured to direct cooling air to the tip cap; and
a flow accelerator positioned within the tip cap passage, wherein the flow accelerator is hollow with an outer wall and interior space, and
wherein the internal cooling circuit includes a central passage that delivers cooling air that impinges on an underside of the outer wall within the interior space.

* * * * *